United States Patent

Blais

[19]

[11] Patent Number: 6,138,480
[45] Date of Patent: Oct. 31, 2000

[54] APPARATUS FOR CONTROLLING OPTICAL FIBER DIAMETER BASED ON INITIAL GOB MOVEMENT

[75] Inventor: Paul R. Blais, Wilmington, N.C.

[73] Assignee: Corning Incorporated, Corning, N.Y.

[21] Appl. No.: 09/352,018

[22] Filed: Jul. 12, 1999

Related U.S. Application Data

[62] Division of application No. 09/054,341, Apr. 2, 1998, Pat. No. 5,968,221
[60] Provisional application No. 60/045,036, Apr. 28, 1997.
[51] Int. Cl.[7] .................................................. C03B 37/027
[52] U.S. Cl. .............................................. 65/484; 486/491
[58] Field of Search ............................. 65/486, 491, 484, 65/533, 381

[56] References Cited

U.S. PATENT DOCUMENTS 4,801,324   1/1989   Hyland ..................................... 65/485

FOREIGN PATENT DOCUMENTS 4-342435   11/1992   Japan ....................................... 65/384

Primary Examiner—John Hoffmann
Attorney, Agent, or Firm—William J. Chervenak

[57] ABSTRACT

Disclosed is a method of controlling the diameter of a glass rod drawn from a glass preform. The diameter control begins as soon as a glass gob begins to move away from a heated portion of the preform. The velocity of the gob is measured and furnace temperature adjusted to maintain gob velocity at a pre-selected target value. By starting diameter control at this early stage of the process, utilization of the preform is improved as is the utilization of the drawing equipment.

3 Claims, 2 Drawing Sheets

APPARATUS FOR CONTROLLING OPTICAL FIBER DIAMETER BASED ON INITIAL GOB MOVEMENT

This is a Division of application Ser. No. 09/054,341, filed Apr. 2, 1998, now U.S. Pat. No. 5,968,221 which claims the benefit of U.S. Provisional Patent Application Ser. No. 60/045,036, filed Apr. 28, 1997.

BACKGROUND OF THE INVENTION

The invention is directed to a method and apparatus for heating and stretching a glass preform to produce a glass rod having a uniform, pre-selected diameter, while limiting excursions of the rod diameter from the pre-selected value. The novel method and apparatus begins control of the diameter of the glass rod as soon as a portion of the preform reaches a temperature which causes the preform portion to soften and begin moving downward under the influence of gravity.

An efficient method for making a draw preform, from which optical waveguide fiber can be drawn, includes first making a core preform. The core preform is heated and stretched into a plurality of core rods which serve as bait rods for depositing cladding glass. Waveguide fiber performance depends critically on the geometric uniformity and the dimensions of the core and cladding glass. Thus, careful control of preform geometry is required to insure proper geometry of the final waveguide fiber.

In particular, control of the geometry of the core rods drawn from the core preform is crucial. The roundness of the final waveguide fiber as well as the relative core to clad diameter ratio and concentricity depend upon control of the absolute core rod dimensions and the uniformity of the dimensions from point to point along the core rod. The step of drawing the core rod from the core preform has become even more important due to the recent increase in demand for very high performance waveguide fibers. Low attenuation and high bandwidth depend strongly on waveguide geometry. In addition, the cost of core dopants such as germanium continue to increase, thus providing motivation to improve utilization of the core preform, which contains essentially all of the dopant material used in the waveguide manufacturing process.

The most inefficient part of the core rod drawing process is in the initial step. The preform is lowered into a furnace until the preform tip and a portion of the preform adjacent the tip is within the furnace hot zone. The preform portion softens and a gob of glass begins to flow from the preform tip. As the glass gob stretches away from the preform tip, the gob of glass, which is suspended from the preform by a strand of glass, emerges from the furnace where it can be gripped by a mechanical device. Once the glass strand is gripped, the geometry control algorithm, which includes grip device velocity and tension in the glass, is activated and the diameter of the strand is brought to a target value. The target velocity refers to the velocity of a point on the glass rod measured at a time when the process is steady state and the diameter of the rod is nominal. The control parameters are:

furnace temperature;

drawing (grip) velocity;

drawing tension; and, feed rate of the preform into the hot zone.

The variables are closely interrelated. For example, a decrease in furnace temperature will cause drawing velocity to decrease unless the drawing tension is increased. If drawing tension is increased without increasing furnace temperature or downfeed rate, rod diameter will fall below target value. For proper diameter control, continuous measurements of diameter must be taken and the control parameters adjusted, usually semi-continuously. Typically, a computer is interfaced with the control devices of a preform drawing apparatus and an algorithm is employed to control the diameter of the drawn glass rod.

Control of the interactive drawing parameters is most accurate when the glass rod diameter is close to the target value, i.e., when only small changes in control parameters are needed. A problem intrinsic to the preform drawing process is the distance the initial gob of glass must travel from the preform before the connecting glass strand or rod can be gripped and fully controlled drawing can begin. The glass strand may have a diameter as much as a factor of ten smaller than the target diameter before the strand can be gripped and diameter control begin. The result is an appreciable fraction, as much as 25%, of core preform glass can be lost in the gob drop and the off target rod length drawn while the required large diameter correction is made.

Thus there is a need in the waveguide manufacturing process for an improved preform drawing method and associated apparatus which decreases preform glass losses, thereby decreasing cost and increasing equipment utilization, by controlling the diameter of the drawn rod from the beginning of glass gob drop, i.e., before the glass is gripped. In particular, greatest savings in time and materials is achieved when diameter control begins before the diameter of the glass strand stretching between the gob and the preform body has deviated far from the target diameter.

SUMMARY OF THE INVENTION

The present invention meets the need for improved control of the initial stages of the preform drawing process.

A first aspect of the invention is a method of controlling the diameter of a glass rod drawn from an elongated preform. The preform is suspended vertically in the furnace so that the preform tip and a preform portion adjacent the tip is in the furnace hot zone. The preform is heated until the preform softens and a gob of glass begins to drop away from the preform under the influence of gravity. A strand or rod of glass, connecting the gob and the remainder of the preform, is drawn along with the gob. In a key process step, the velocity of the moving gob is measured while the diameter of the connecting strand differs from target diameter of the rod by no more than ±75%. This velocity measurement may be used in two ways. A data base containing the velocity measurements can be compiled and analyzed to find the furnace temperature which provides a gob drop velocity consistent with the preselected rod diameter. Starting the draw procedure at this empirically determined furnace temperature insures the rod diameter during gob drop will remain within the range ±75% of target diameter. When the furnace start temperature is well characterized, there is often no need to adjust furnace temperature in the time interval between beginning of gob drop and the engaging of the gripper. In one embodiment of the method the furnace is set at a first temperature to heat the tip of the preform. Once a gob has formed the furnace is set to a second temperature which is maintained until the gob has dropped through the furnace and the gripper is engaged. In general the first temperature is higher than the second temperature. The first temperature is generally in the range of 20° C. to 100° C higher than the second temperature. The gripper is a mechanical device which grasps and pulls the glass rod after it has emerged from the furnace. Diameter of the rod at the time the gripper is engaged is typically much less than ±75% of target value. However, the method and apparatus will function when initial rod diameter is within the ±75% range.

As an alternative, the furnace temperature may be adjusted during gob drop to maintain the rod within ±75% of the target rod diameter. Also, this quasi-continuous adjustment method may be employed in cases in which an empirical furnace gob drop temperature is not known. The target drawing velocity, which is associated with the target rod diameter, may be calculated from the preform diameter and the target diameter. Diameter control of the rod begins when the first measurement of velocity is completed. If the velocity is higher than target, the furnace temperature is decreased and conversely for cases in which rod diameter is below target. As successive velocity measurements are made, furnace temperature is adjusted as the gob drops through the furnace. When the gob and its trailing rod have emerged far enough from the furnace to be gripped, the velocity measuring means is pivoted out of the path of the gob drop and a gripping means is employed to continue the drawing of the rod. The initial downward velocity of the gripping means is set at a fraction of the last velocity measured by the measuring means. An acceptable initial gripper velocity which is at least about 40% of the last measured velocity has been found acceptable. A preferred initial gripper velocity is about 55% of the gob velocity measured just before the gripper engages the rod. The velocity measurements together with the preform dimensions also are used to determine the proper rate at which the preform should be lowered into the furnace hot zone. The preform rate of movement derives from the calculation which balances the mass moving into the hot zone with that moving out of the hot zone.

In an embodiment of the novel preform drawing method, after the gripper is engaged, the draw tension is held constant at a pre-selected value and diameter is controlled by adjusting the other control parameters.

Because diameter control begins at a very early stage of gob drop, the diameter is never allowed to reach a value too far from the target value. The time to reach target diameter is greatly reduced and preform utilization is dramatically improved.

The method is most effectively employed by making the first velocity measurement early enough in the process to insure the gob velocity is less than the target velocity. The measurement means must therefore be moved into the furnace to sense the gob just as it leaves the tip of the preform. Thus, the sensing portion of the measuring means must be made of a heat resistant material.

The control of the furnace temperature and other parameters which determine rod diameter is best carried out using a computer programmed with an appropriate control algorithm based upon preform dimensions, gob velocity and target velocity, and other pertinent variables effective to control rod diameter, such as rod tension. Setting the initial gripping means velocity equal to an appropriate fraction of last measured gob velocity affords a smooth transition from initial diameter control to steady state diameter control. Steady state control begins when the gripping means begins to draw the rod from the preform. Excellent initial control and transition to steady state control is achieved in the case where the initial gripper velocity is lower than the last measured gob velocity. It is of course possible to bring the process to steady state when, initially, gob velocity is less than initial gripper velocity.

An embodiment of the measurement means includes, a heat resistant plate and an associated sensor which senses contact between the plate and the gob. The plate indexes a pre-selected distance away from the gob immediately after contact is sensed. When the gob again makes contact with the plate, the gob velocity is calculated from the known time of travel and distance of travel of the gob. This measurement sequence is repeated as the gob drops through the furnace.

In one embodiment of the plate and sensor combination, the sensing means is a scale mechanism which measures gob weight supported by the plate. In a preferred embodiment, a gob and plate contact is registered when the gob weight supported by the plate is no greater than 10 grams.

A second aspect of the invention is an apparatus for controlling the diameter of a rod drawn from a preform. The apparatus includes a furnace mounted vertically on a frame. A preform suspension device, which can move to center the preform in the furnace in a horizontal plane and move the preform up or down in the furnace, is located above the furnace.

The means for measuring the gob velocity is located below the furnace and is mounted so that it can move vertically up or down. It is convenient to provide a mount for the measuring means which can be pivoted or slid out of the path of the dropping gob when enough of the gob and associated glass strand have emerged from the furnace to allow the gob and glass strand to be gripped. The gripping means is also located below the furnace and is moved into position for gripping the glass rod after the velocity measuring means has been pivoted or slid away from the emerging glass gob.

The measuring means, the preform suspension means and the gripper means are motor driven, typically by precision stepper motors. The motors may be controlled by a computer which is interfaced with them. The computer may contain the algorithm for adjusting furnace temperature, preform movement, and velocity sensor movement in the initial stage of preform drawing which begins with the start of gob drop. The computer may also contain the algorithm which includes gripper velocity control so that a smooth transition can be made between the initial drawing stage and the drawing stage in which the gob and associated glass strand have been engaged by the gripper.

In an embodiment of the apparatus, a means for measuring force applied to the preform, i.e., preform tension, is incorporated into the gripping means. The measuring means may be a load cell. The tension so measured may be used as an adjustable parameter in the model for maintaining rod diameter control. It is advantageous to control furnace temperature based upon this tension measurement. As an alternative, the means, such as a load cell, may be used to maintain constant applied tension during the preform drawing process.

DETAILED DESCRIPTION OF THE INVENTION

Figure 1:
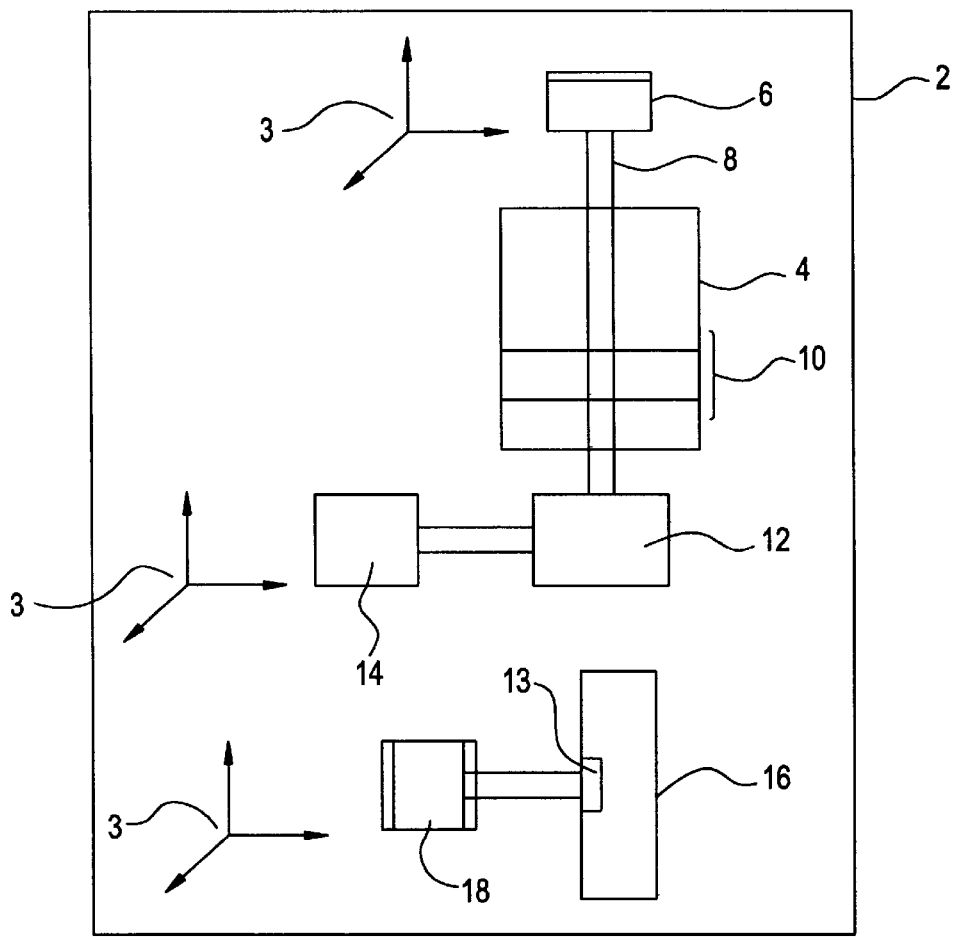
FIG. 1 is a block schematic of the apparatus for drawing a rod from a preform.

The block schematic of FIG. 1 shows the parts of the apparatus and their approximate relative locations. A rigid frame 2 supports the components of the preform drawing equipment comprising a furnace 4, a velocity measurement means 12 supported by means 14, and means for gripping and pulling a rod from the preform, 16 which is supported by means 18. Gripping means 16 includes torque measuring means 13. The preform 8 is suspended in the furnace by holding means 6. The furnace hot zone is indicated as the region 10.

The axes 3 drawn next to the holding or supporting means 6, 14, and 18 indicate these supports are mounted to move in the horizontal and vertical planes. Thus the support 6 can center the preform 8 in furnace 4 and move the preform into or out of the furnace. Support 14 can center the velocity measuring means 12 on the bottom opening of the furnace and move the means 12 toward the preform tip to sense the gob velocity. The support 14 is mounted so that it can slide or pivot measuring means 12 away from the path of the gob. The support 18 positions the gripping means in the horizontal plane to grip the gob and trailing rod as they move out of the furnace. The support moves the gripping means toward the furnace to first grip the rod and then away from the furnace to draw the rod. To ensure a smooth movement of the drawn rod after gripping, at least two independently moving gripping means may be used. After the first gripping means has gripped the rod and is near the end of its travel away from the furnace, a second gripping means is moved into position to grip the rod near the location at which the rod emerges from the furnace. In this way a constant drawing tension may be maintained in the drawn rod until the preform is consumed.

Figure 2:
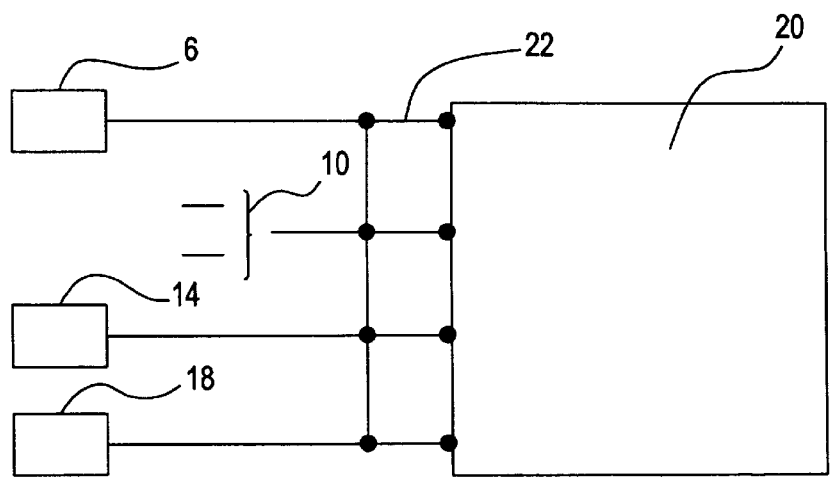
FIG. 2 is a block schematic of the drawing controls interfaced with a controlling means.

A schematic of the diameter controls is shown in FIG. 2. The holding and moving means 6, 14, and 18, as well as the temperature control of the hot zone 10, are connected through an interface 22 to a computer 20. A signal proportional to the rate of movement of moving means 6 and 14 or 18 is sent to the computer. The movement data is compared to a calculated target rate of movement based upon preform geometry and target diameter of the drawn rod. A sensor sends hot zone temperature to the computer. The computer can then adjust the feed rate of the preform into the hot zone and the temperature of the hot zone 10 to arrive at a drawn rod speed which provides the target diameter. The furnace hot zone temperature 10 may be controlled using rod tension as the control parameter. The rod tension may be measured by a load cell (not shown) attached between the gripper and the gripper holding means.

In the initial stage of drawing the rod, the gripping means is not engaged and rod speed is determined chiefly by hot zone temperature. The feed rate of the preform is adjusted to maintain a balance of mass flow into and out of the hot zone. When the glass gob and the trailing rod, i.e., the rod of drawn glass between the preform and the gob, emerge from the furnace, the velocity measuring means is slid or pivoted away and the gripper means moved into position to grip and pull the rod from the furnace. A steady state is reached when furnace temperature, gripper velocity, and down feed rate are such as to provide a drawn rod of the pre-selected target diameter.

Those skilled in the art know that once the rod has emerged far enough out of the furnace, a real time diameter measurement of the rod may be made and sent to the computer for use in the diameter control algorithm. The diameter measuring device, which is commercially available, is not shown. Also the type furnace suitable for this process is known in the art and thus is not discussed at any length here.

EXAMPLE

A preform of silica based glass doped with germania was drawn into a rod using a graphite induction furnace. The initial diameter of the preform was 76 mm. The target diameter of the drawn rod was 23 mm. The preform tip was lowered into the hot zone of the furnace which was initially set at 1915° C. This temperature was empirically determined as suited to the preform. After the gob had formed the furnace hot zone temperature was reduced to 1880° C. and maintained there while the gob dropped through the furnace. No further adjustment of temperature was needed prior to engaging the gripper. The gob velocity measuring means comprised a K-Karb$^R$ plate and rod mounted on a 0–300 gram load cell. The plate was moved in the vertical direction by means of a linear slide and motor. The plate and rod, load cell, and linear slide and motor are available from Lintech, Monmouth Calif. An air slide was provided to allow the assembly to be moved out of the drawing path once the gob and trailing rod had emerged a sufficient distance out of the furnace to allow gripping. The plate could be positioned with an accuracy of ±1 mm. The initial position of the plate was 5 mm below the tip of the preform. The control program was set to index the plate downward by 3 mm as soon as a weight of 10 grams was supported by the plate. When the gob again produced a 10 gram load on the plate, the average velocity of the gob was calculated using the measured travel time over a preselected distance. The velocity measurements were repeated about 30 times as the gob moved away from the body of the preform. In this experiment, the furnace hot zone temperature was not adjusted, as noted above. However an adjustment could have been made after every velocity measurement.

The target gob velocity was calculated to be 180 mm/sec. The diameter of the rod when it was engaged by the gripper was in the range 18–23 mm, a value very close to the target diameter. The initial velocity of the gripping means was set at 55% of the last measured velocity of the gob.

By measuring gob velocity from the beginning of gob drop, it was possible to choose a constant furnace temperature which provided for an initial rod diameter rod near the target value. The diameter of the rod was held to within +1 mm and −5 mm of the target value. Because this tolerance was held over the gob drop time interval using the novel drawing process, the utilization of the preform, which is defined as the ratio of the rod weight to the preform weight, was 75% as compared to 61.8% using the original rod drawing process. Note that savings in germanium usage are directly proportional to the improvement in preform utilization.

Figure 3:
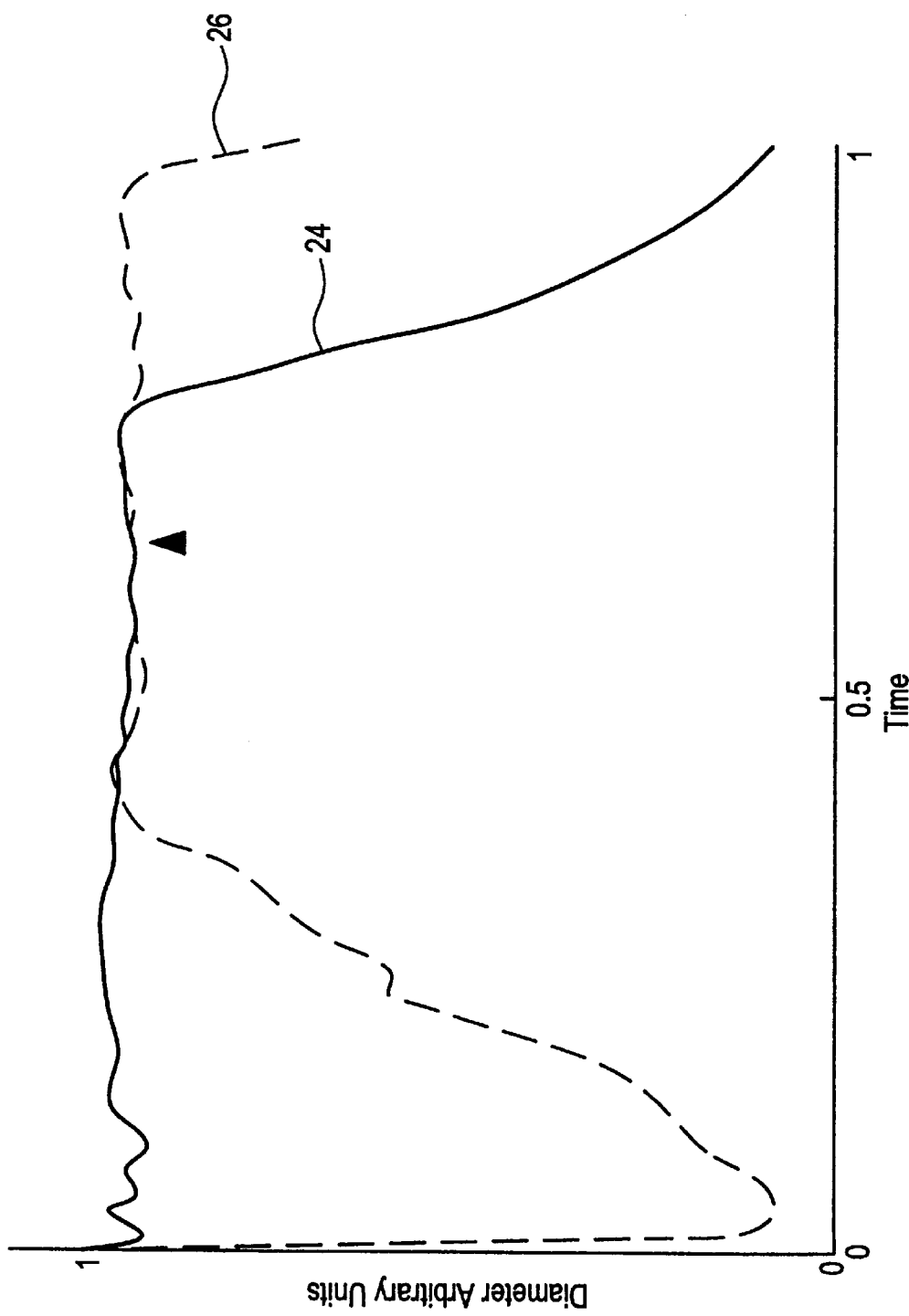
FIG. 3 is a chart of rod diameter versus time typical of the original as compared to the invented process.

A comparison of the invented process to the original rod drawing process is shown in FIG. 3. The original method, characterized by curve 24, shows a steep downward trend during gob drop. About one third of the drawing time is used in bringing the rod diameter to the target value, indicated as 1 on the y-axis. The flat diameter versus time curve 26, representative of the novel process shows a much improved response time and greater utilization of the preform.

Although particular embodiments of my invention have herein been disclosed and described, the scope of my invention is nonetheless limited only by the following claims.

I claim:

1. An apparatus for controlling diameter of a glass rod drawn from an elongated preform, comprising:
   a frame;
   a furnace fixedly attached to the frame, the furnace having a hot zone, hot zone temperature adjustment means, and a vertical axis;
   suspension means movably attached to the frame above the furnace for holding and vertically moving a glass preform, a portion of the preform being held in the hot zone of the furnace so that a portion of the glass preform will soften and move downward out of the furnace;

a sensing plate movably attached to the frame below the furnace, to move vertically and pivotally attached to the frame to pivot away from the vertical axis of the furnace, wherein the sensing plate is for determining the velocity of glass moving downward;

movable means for gripping the glass, which moves out of the furnace, and pulling the glass downward veritically;

first moving means for moving the sensing plate vertically;

second moving means for moving the suspension means vertically;

third moving means for moving the gripping means vertically;

computing means, interfaced with the hot zone temperature adjusting means, the sensing plate, the first moving means, the second moving means, and the third moving means, for receiving velocity data from the sensing plate, adjusting the hot zone temperature to control the glass velocity control velocity, and adjust suspension means velocity to achieve a mass balance of glass entering and leaving the furnace hot zone.

2. The apparatus of claim 1 wherein the first, second and third moving means are stepper motors.

3. The apparatus of claim 1 wherein the gripping means includes means for measuring the tension in the preform during drawing and the tension measurement is sent to the computing means for use in adjusting furnace hot zone temperature.

* * * * *

UNITED STATES PATENT AND TRADEMARK OFFICE
CERTIFICATE OF CORRECTION

PATENT NO.   : 6,138,480
DATED        : October 31, 2000
INVENTOR(S)  : Paul R. Blais It is certified that error appears in the above-identified patent and that said Letters Patent is hereby corrected as shown below:

Column 7,
Line 11, the word "vertically" should be deleted and replaced with -- parallel to the axis of the furnace --.

Signed and Sealed this

Twelfth Day of November, 2002

Attest:

JAMES E. ROGAN
Attesting Officer          Director of the United States Patent and Trademark Office